United States Patent
Mohr

(10) Patent No.: US 9,768,672 B2
(45) Date of Patent: Sep. 19, 2017

(54) INTEGRATED SYSTEM OF TRACTION MOTOR AND INVERTER AND METHOD FOR INTEGRATING TRACTION MOTOR AND INVERTER

(71) Applicant: Zhongshan Broad-Ocean Motor Co., Ltd., Zhongshan (CN)

(72) Inventor: Bertrand Robert Mohr, Ann Arbor, MI (US)

(73) Assignee: ZHONGSHAN BROAD-OCEAN MOTOR CO., LTD., Zhongshan (CN)

( * ) Notice: Subject to any disclaimer, the term of this patent is extended or adjusted under 35 U.S.C. 154(b) by 529 days.

(21) Appl. No.: 14/533,078

(22) Filed: Nov. 4, 2014

(65) Prior Publication Data

US 2015/0333602 A1 Nov. 19, 2015

(30) Foreign Application Priority Data

May 15, 2014 (CN) .......................... 2014 1 0205998

(51) Int. Cl.
| | | |
|---|---|---|
| H02K 11/00 | (2016.01) | |
| H02K 9/19 | (2006.01) | |
| H02K 11/225 | (2016.01) | |
| H02K 11/25 | (2016.01) | |
| H02K 11/33 | (2016.01) | |

(52) U.S. Cl.
CPC .......... *H02K 11/0073* (2013.01); *H02K 9/19* (2013.01); *H02K 11/225* (2016.01); *H02K 11/25* (2016.01); *H02K 11/33* (2016.01); *Y10T 29/49011* (2015.01)

(58) Field of Classification Search
CPC ...... H02K 11/33; H02K 5/225; H02K 11/048; H02K 9/19
USPC ........................... 310/54, 89, 68 R, 71, 68 D
See application file for complete search history.

(56) References Cited

U.S. PATENT DOCUMENTS

| | | | |
|---|---|---|---|
| 7,969,052 B2 * | 6/2011 | Ichise ................. | F04B 39/0044 310/68 D |
| 2011/0095659 A1 * | 4/2011 | Hattori .................. | F04B 39/121 310/68 D |
| 2011/0193452 A1 * | 8/2011 | Yakushiji ................ | F04B 39/06 310/68 D |
| 2012/0286630 A1 * | 11/2012 | Tomizawa ............. | H02K 11/33 310/68 D |
| 2013/0119834 A1 * | 5/2013 | Nakagami ............. | F04B 39/121 310/68 D |
| 2014/0202781 A1 * | 7/2014 | Soma ....................... | H02K 3/50 180/65.1 |

* cited by examiner

*Primary Examiner* — Thanh Lam
(74) *Attorney, Agent, or Firm* — Matthias Scholl, PC; Matthias Scholl

(57) ABSTRACT

A method for integrating a traction motor and an inverter, the method including: 1) providing a traction motor, the traction motor including a motor housing and a coil winding; 2) providing an inverter, the inverter including: an inverter housing, and an IGBT module; 3) independently installing the inverter in the inverter housing to form an interface, the interface including a mechanical interface and a high-voltage power interface; 4) using the mechanical interface to install the inverter housing on the motor housing to form an entire body; and 5) using the high-voltage power interface to provide a high voltage electric connection between the coil winding of the traction motor and the IGBT module of the inverter.

15 Claims, 15 Drawing Sheets

INTEGRATED SYSTEM OF TRACTION MOTOR AND INVERTER AND METHOD FOR INTEGRATING TRACTION MOTOR AND INVERTER

CROSS-REFERENCE TO RELATED APPLICATIONS

Pursuant to 35 U.S.C. §119 and the Paris Convention Treaty, this application claims the benefit of Chinese Patent Application No. 201410205998.9 filed May 15, 2014, the contents of which are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND OF THE INVENTION

Field of the Invention

The invention relates to a method for integrating a traction motor and an inverter and an integrated system of traction motor and an inverter.

Description of the Related Art

As shown in FIGS. 1-3, an integrated power system of an existing electric car includes an independent traction motor 101 and an inverter 102. The traction motor 101 and the inverter 102 are independently and separately arranged and are in electric connection via a high-voltage power cable, a low-voltage signal harness, and a plurality of connectors 103. The inverter 102 includes: a control box 1021, and an IGBT module 1022, a driving board 1023, and a control board (MCU) 1024 that are disposed inside the control box 1021. A motor housing 1011 of the traction motor 101 is provided with a first cooling water channel. The bottom surface of the control box 1021 is provide with a second cooling water channel 1025. The first cooling water channel and the second cooling water channel 1025 are connected in series via a water pipe 104. However, the integrated power system has the following problems: 1) The traction motor and the inverter are independently and separately arranged, which results in too many wirings, troublesome connection, high production cost, and relatively large volume. 2) The traction motor and the inverter are connected by high-voltage cables, high-voltage signals produced by the high-voltage power cable and the IGBT module will affect normal operations of the driving board and the control board, thereby resulting in serious disturbance, and decreasing reliability and the operation efficiency of the motor controller. 3) A large number of components are disposed inside the inverter, connections among the components are complex, the wiring harnesses are too many, the production cost is high, connection errors prone to occur, and the reliability is low. 4) Both the traction motor and the motor controller utilize separate water cooling channels to dissipate heat, so that the heat dissipation performance of the integrated system is relatively low, the overall performance and the efficiency of the system are affected, and the service life and the reliability of the system are decreased.

SUMMARY OF THE INVENTION

In view of the above-described problems, it is one objective of the invention to provide a method for integrating a traction motor and an inverter.

It is another objective of the invention to provide an integrated system of a traction motor and an inverter. The system has a simple structure, convenient and reliable connection, low volume, low weight, low cost, excellent overall performance, high efficiency, and high reliability.

To achieve the above objective, in accordance with one embodiment of the invention, there is provided a method for integrating a traction motor and an inverter, the method comprising: 1) providing a traction motor, the traction motor comprising a motor housing and a coil winding; 2) providing an inverter, the inverter comprising: an inverter housing, and an IGBT module; 3) independently installing the inverter in the inverter housing to form an interface, the interface comprising a mechanical interface and a high-voltage power interface; 4) using the mechanical interface to install the inverter housing on the motor housing to form an entire body; and 5) using the high-voltage power interface to provide a high voltage electric connection between the coil winding of the traction motor and the IGBT module of the inverter.

In a class of this embodiment, the interface further comprises a low-voltage signal interface. The low-voltage signal interface is utilized to provide a low-voltage electric connection between the traction motor and the inverter. A detection signal inside the traction motor is transmitted to the inverter via the low-voltage signal interface.

In a class of this embodiment, the interface further comprises a cooling system interface. The cooling system interface enables a cooling medium to flow between the inverter housing and the motor housing.

In accordance with another embodiment of the invention, there is provided an integrated system of a traction motor and an inverter. The system comprises: the inverter, the inverter comprising: a control board, a driving board, the IGBT module, the inverter housing, the mechanical interface, and the high-voltage power interface; and the traction motor, the traction motor comprising: a stator assembly, a rotor assembly, and the motor housing. The stator assembly comprises the coil winding. The control board, the driving board, and the IGBT module are disposed inside the inverter housing. The inverter housing is disposed on the motor housing via the mechanical interface. The traction motor and the inverter are connected via the high-voltage power interface to enable the coil winding and the IGBT module of the inverter to realize the high-voltage electric connection.

In a class of this embodiment, the traction motor and the inverter are further connected via a low-voltage signal interface. The low-voltage signal interface transmits an operation state of the traction motor to the inverter.

In a class of this embodiment, the traction motor and the inverter are further connected via a cooling system interface. A bottom part of the inverter housing comprises: a first cooling water channel, a first water inlet, and a first water outlet. The motor housing comprises: a second cooling water channel, a second water inlet, and a second water outlet. The first water outlet is connected to the second water inlet via the cooling system interface so as to connect the first cooling water channel of the inverter housing and the second cooling water channel of the motor housing in series.

In a class of this embodiment, the cooling system interface is a water pipe interface.

In a class of this embodiment, the mechanical interface comprises a plurality of mounting feet protruding from the inverter housing. A bearing seat protrudes from a top of the motor housing. The inverter housing is disposed on the top of the motor housing. The mounting feet are supported by the bearing seat and are fastened on the bearing seat by bolts.

In a class of this embodiment, the high-voltage power interface comprises: a high-voltage power terminal extending from the IGBT module to a bottom surface of the inverter, a mounting seat disposed at an end part of a motor housing, and a wiring chamber disposed beneath the mounting seat. The coil winding of the traction motor is connected to a coil terminal in the wiring chamber of the motor housing. The high-voltage power terminal passes through the mounting seat and is extended into the wiring chamber and is in electric connection with the coil terminal.

In a class of this embodiment, an outer surface of an end cover is convex to form an annular skirt board. The annular skirt board encircles to form the wiring chamber. A mounting cover plate is disposed on the annular skirt board.

In a class of this embodiment, the low-voltage signal interface comprises: a resolver signal terminal and a motor temperature sensor terminal. A first signal wire and a second signal wire are led out from a resolver and a motor temperature sensor and are connected to the resolver signal terminal and the motor temperature sensor terminal, respectively. A lead socket protrudes from the bottom surface of the inverter close to the high-voltage power interface. The lead socket passes through the mounting seat and is extended inside the wiring chamber. The resolver signal terminal and the motor temperature sensor terminal are inserted into the lead socket.

In a class of this embodiment, the inverter housing further comprises a high-voltage DC bus voltage input interface and an external low-voltage signal interface.

In a class of this embodiment, a high-voltage interlock mechanism is disposed on the wiring chamber and the mounting cover plate.

In a class of this embodiment, the high-voltage interlock mechanism comprises: a first connector disposed inside the wiring chamber, and a second connector disposed on the mounting cover plate. When the mounting cover plate is mounted on a top surface of the annular skirt board, the first connecter and the second connector are in electric connection. The low-voltage signal interface further comprises a high-voltage interlock terminal. A third signal wire led from the first connector is connected to the high-voltage interlock terminal. The high-voltage interlock terminal is inserted into the lead socket.

Advantages according to embodiments of the invention are summarized as follows:

1) The method for integrating the traction motor and the inverter comprises: independently installing the inverter with the separate inverter housing to form the interface; providing the interface comprising the mechanical interface and the high-voltage power interface; using the mechanical interface to install the inverter housing on the motor housing to form an entire body; using the high-voltage power interface to provide the high voltage electric connection between the coil winding of the traction motor and the IGBT module of the inverter; utilizing the low-voltage signal interface to provide the low-voltage electric connection between the traction motor and the inverter; and transmitting the detection signal inside the traction motor to the inverter via the low-voltage signal interface. The method is simple, the connection is simple and convenient, so that the overall performance and the efficiency of the system are improved, the connecting harnesses are decreased, the reliability is high, and the cost is lowered. Besides, the cooling system interface enables the cooling medium to flow between the inverter housing and the motor housing, the heat dissipation effect is much better, and the volume is much compact.

2) The integrated system of the invention comprises the inverter and the traction motor. The inverter further comprises the inverter housing. The control board, the driving board, and the IGBT module are disposed inside the inverter housing. The inverter housing is installed on the motor housing via the mechanical interface. The traction motor and the inverter are connected via the high-voltage power interface to enable the coil winding and the IGBT module of the inverter to realize the high-voltage electric connection. The connection is simple and convenient, the overall performance and efficiency of the system is improved, the connecting harnesses are decreased, the reliability of the system is high, the cost is low, and the volume is much compact.

3) The traction motor and the inverter are further connected via the low-voltage signal interface. The low-voltage signal interface transmits the operation state of the traction motor to the inverter. The connection is convenient and reliable, and the reliability is high.

4) The first water outlet is connected to the second water inlet via the cooling system interface so as to connect the first cooling water channel of the inverter housing and the second cooling water channel of the motor housing in series. Thus, the structure is simple, the connection is reliable and convenient, the heat dissipation performance and the efficiency of the system are improved, and the production cost thereof is decreased.

5) The mechanical interface comprises a plurality of the mounting feet protruding from the inverter housing. THE bearing seat protrudes from the top of the motor housing. The inverter housing is disposed on the top of the motor housing. The mounting feet are supported by the bearing seat and are fastened on the bearing seat by bolts. The system has a simple structure, convenient and firm installation, high reliability, and relatively small volume.

6) The low-voltage signal interface comprises: the resolver signal terminal and the motor temperature sensor terminal. The first signal wire and the second signal wire are led out from the resolver and the motor temperature sensor and are connected to the resolver signal terminal and the motor temperature sensor terminal, respectively. The lead socket protrudes from the bottom surface of the inverter close to the high-voltage power interface. The lead socket passes through the mounting seat and is extended inside the wiring chamber. The resolver signal terminal and the motor temperature sensor terminal are inserted into the lead socket. The high-voltage power interface comprises: the high-voltage power terminal extending from the IGBT module to the bottom surface of the inverter, the mounting seat disposed at an end part of the motor housing, and the wiring chamber disposed beneath the mounting seat. The coil winding of the traction motor is connected to the coil terminal in the wiring chamber of the motor housing. The high-voltage power terminal passes through the mounting seat and is extended into the wiring chamber and is in electric connection with the coil terminal. The revolver signal terminal and the motor temperature sensor terminal are inserted into the lead socket. Thus, the wiring is convenient, the structure is simple, the integration degree is high, the connecting harnesses are small, and the reliability of the product is improved.

7) The outer surface of an end cover is convex to form the annular skirt board. The annular skirt board encircles to form the wiring chamber. The mounting cover plate is disposed on the annular skirt board. When the wiring is completed, the mounting cover plate is closed so as to improve the dust-proof and waterproof performances and improve the safety, thereby being convenient and reliable.

8) The high-voltage interlock mechanism is disposed on the wiring chamber and the mounting cover plate. When the mounting cover plate is opened, the high-voltage interlock mechanism disconnects the high-voltage power supply, thereby ensuring the safety of the operation.

BRIEF DESCRIPTION OF THE DRAWINGS

The invention is described hereinbelow with reference to the accompanying drawings, in which.

DETAILED DESCRIPTION OF THE EMBODIMENTS

For further illustrating the invention, experiments detailing a method for integrating a traction motor and an inverter and an integrated system of traction motor and an inverter are described below. It should be noted that the following examples are intended to describe and not to limit the invention.

Figure 1A:
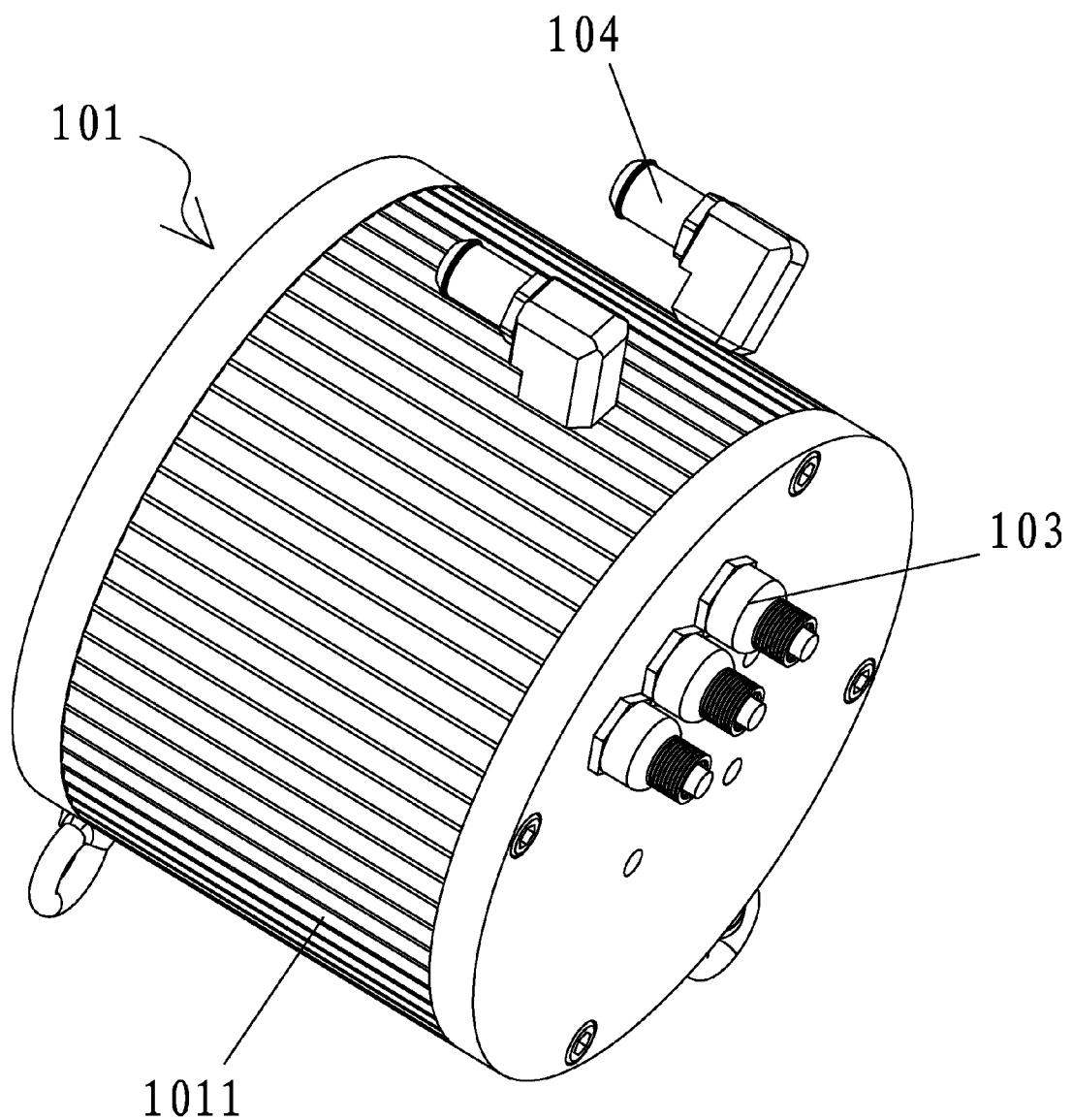
FIG. 1A is a structure diagram of an integrated power system of an existing electric car.
Figure 1B:
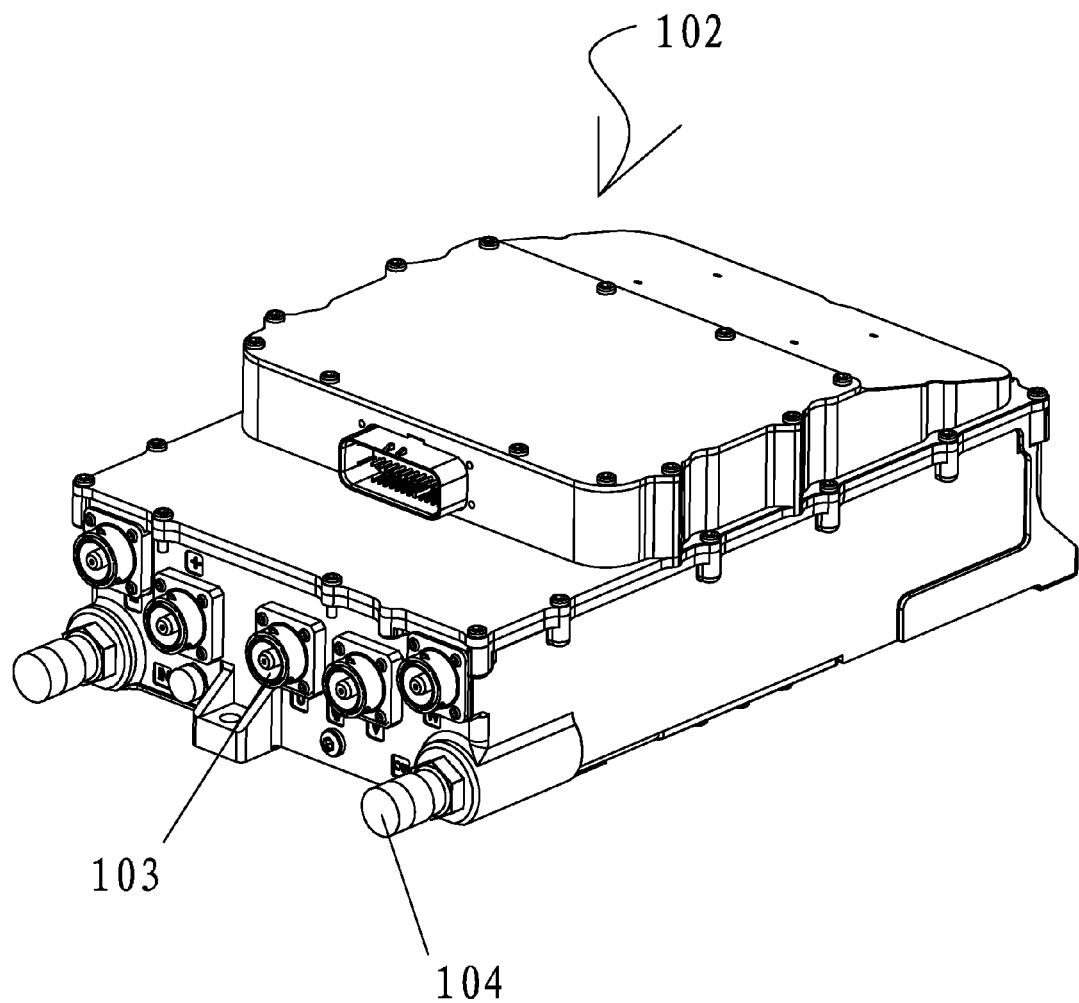
FIG. 1B is another structure diagram of an integrated power system of an existing electric car.
Figure 2:
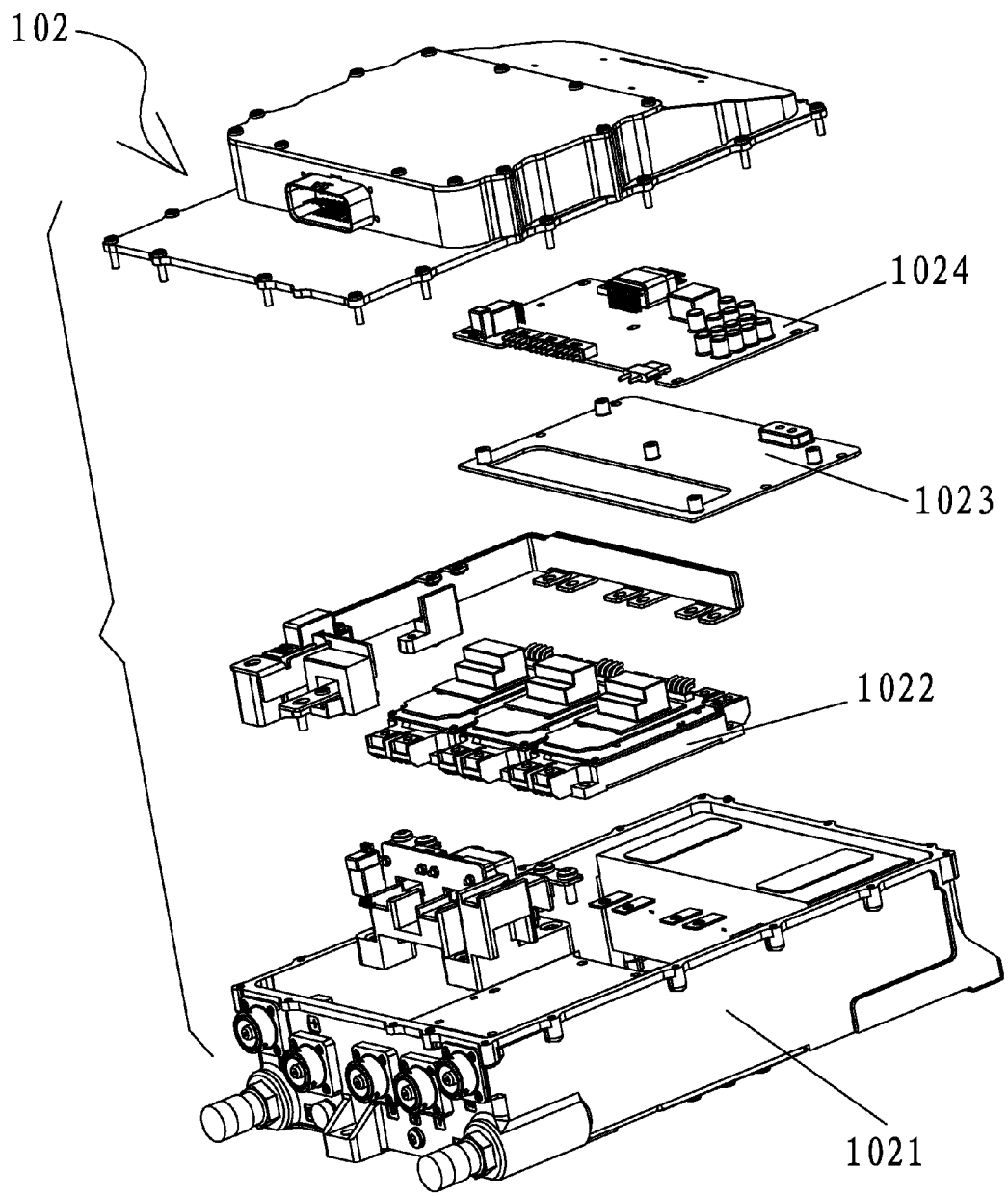
FIG. 2 is an exploded view of an existing motor controller.
Figure 3:
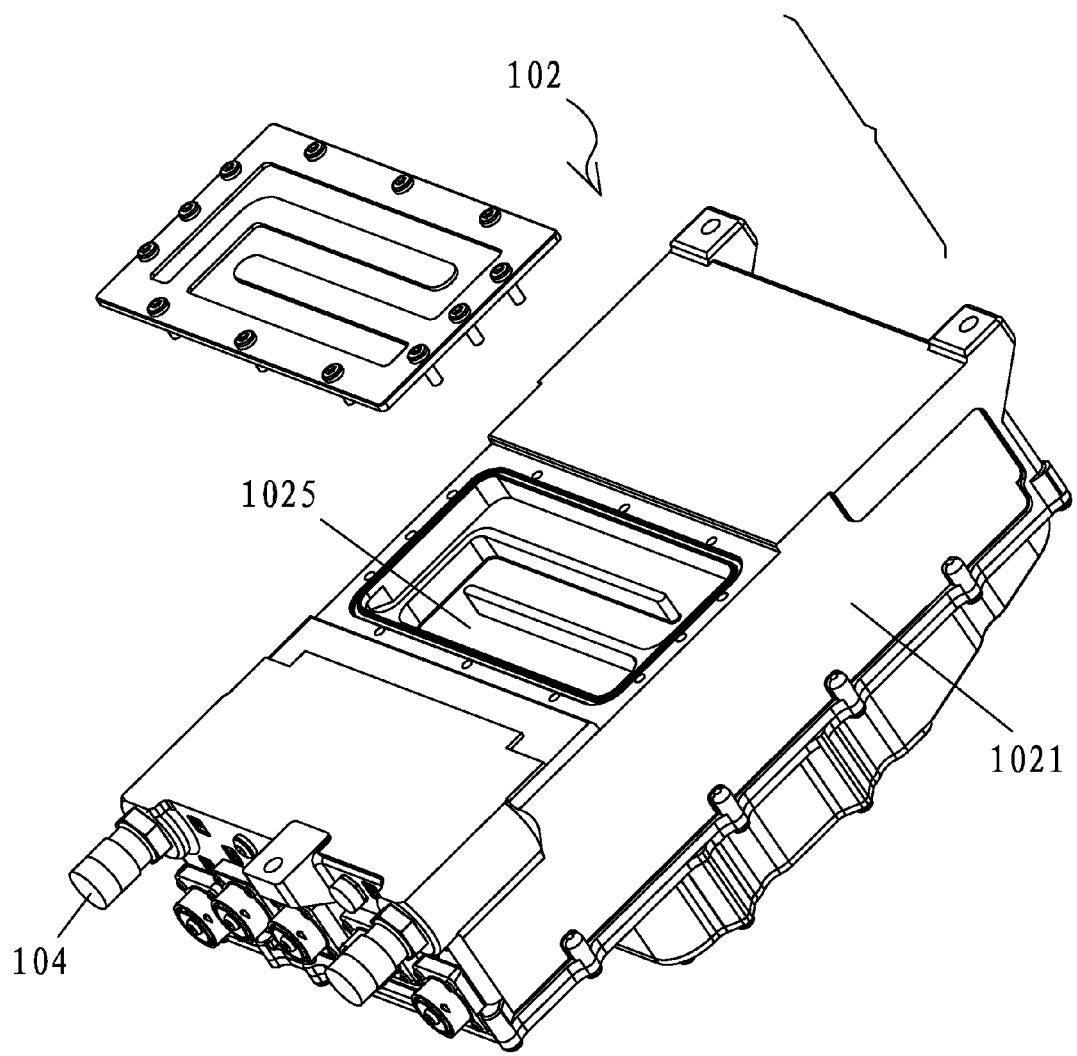
FIG. 3 is another exploded view of an existing motor controller.
Figure 4:
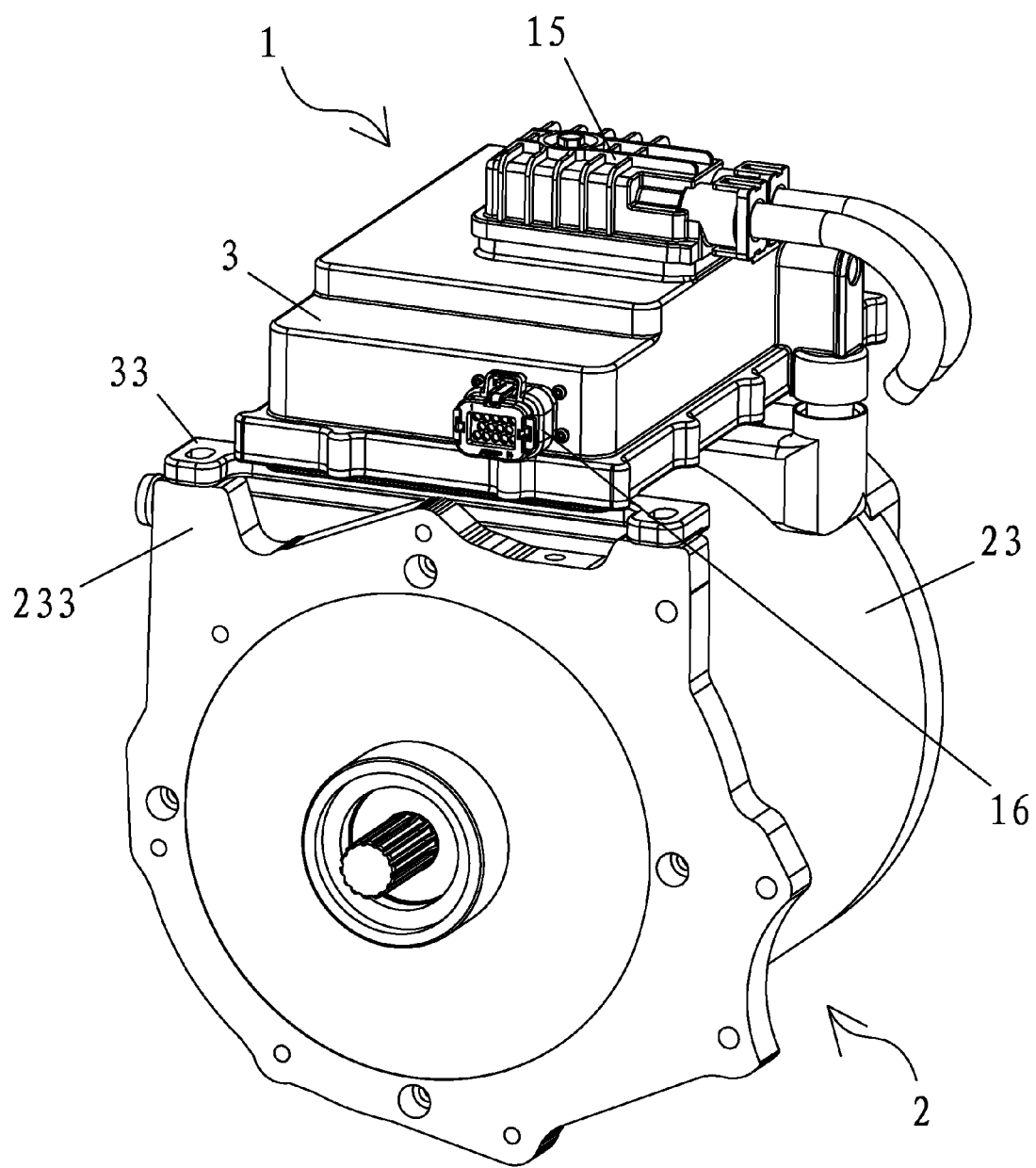
FIG. 4 is a stereogram of an integrated system of a traction motor and an inverter in accordance with one embodiment of the invention.
Figure 5:
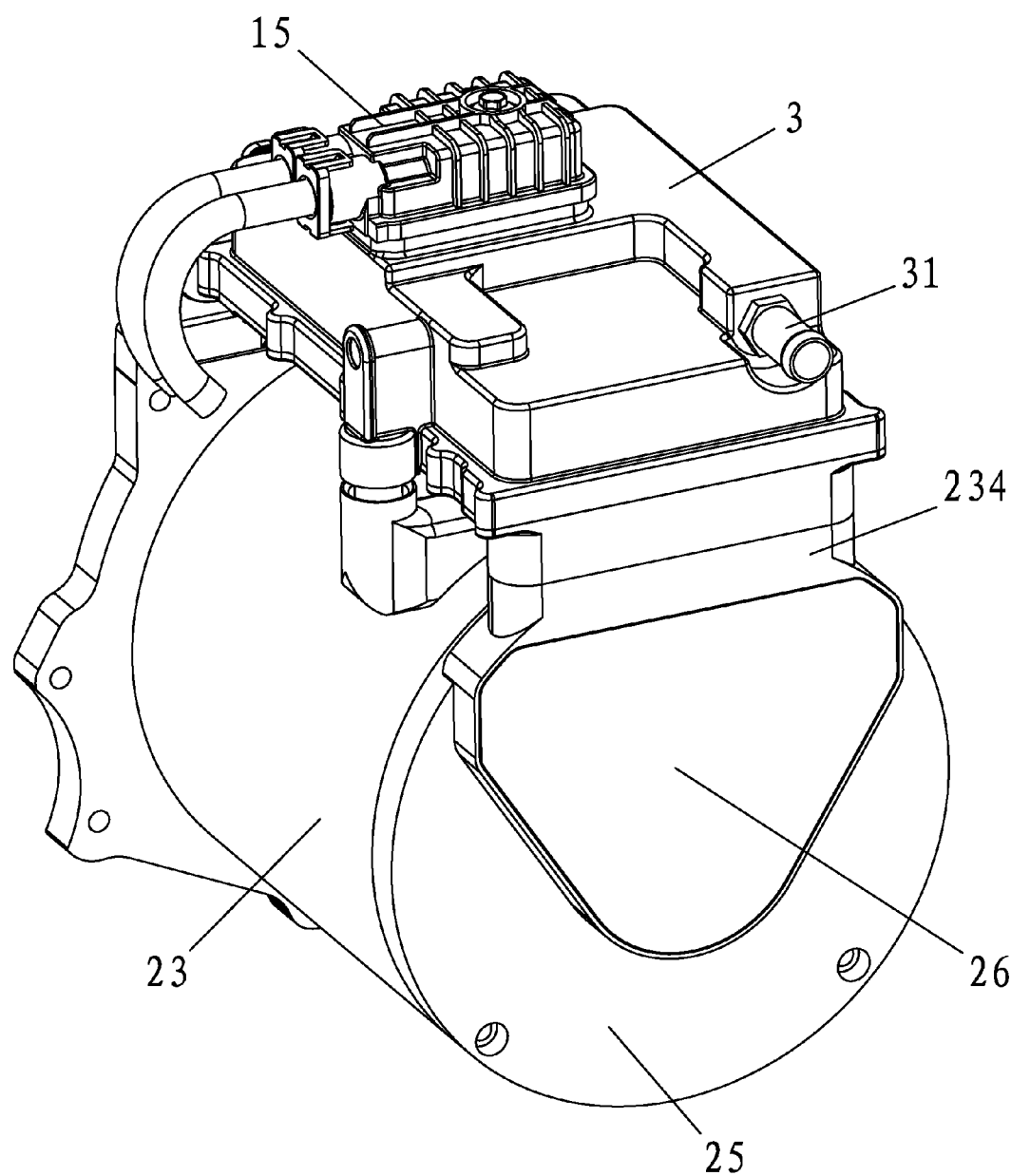
FIG. 5 is another stereogram of an integrated system of a traction motor and an inverter in accordance with one embodiment of the invention.
Figure 6:
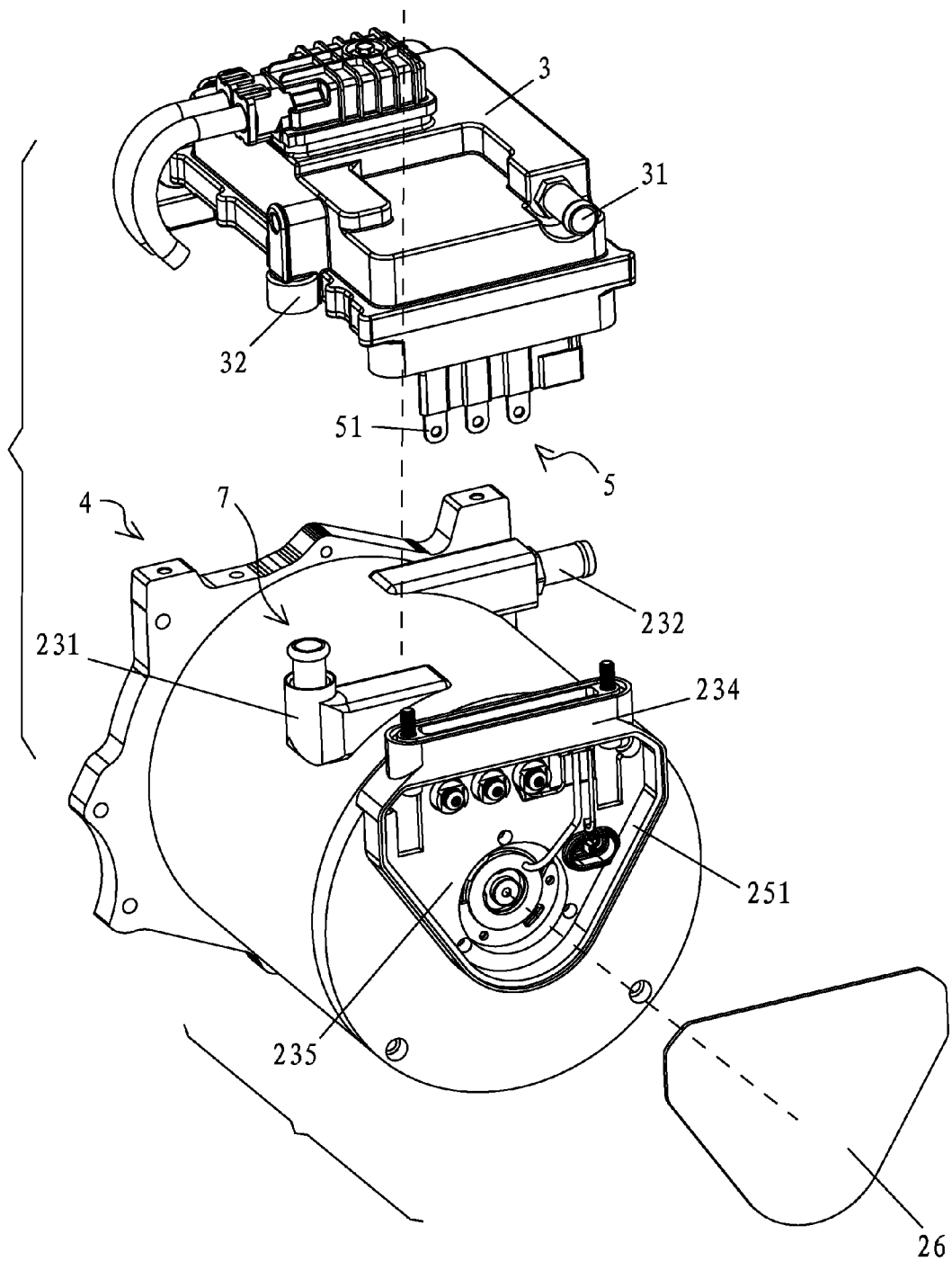
FIG. 6 is an exploded view of an integrated system of a traction motor and an inverter in accordance with one embodiment of the invention.
Figure 7:
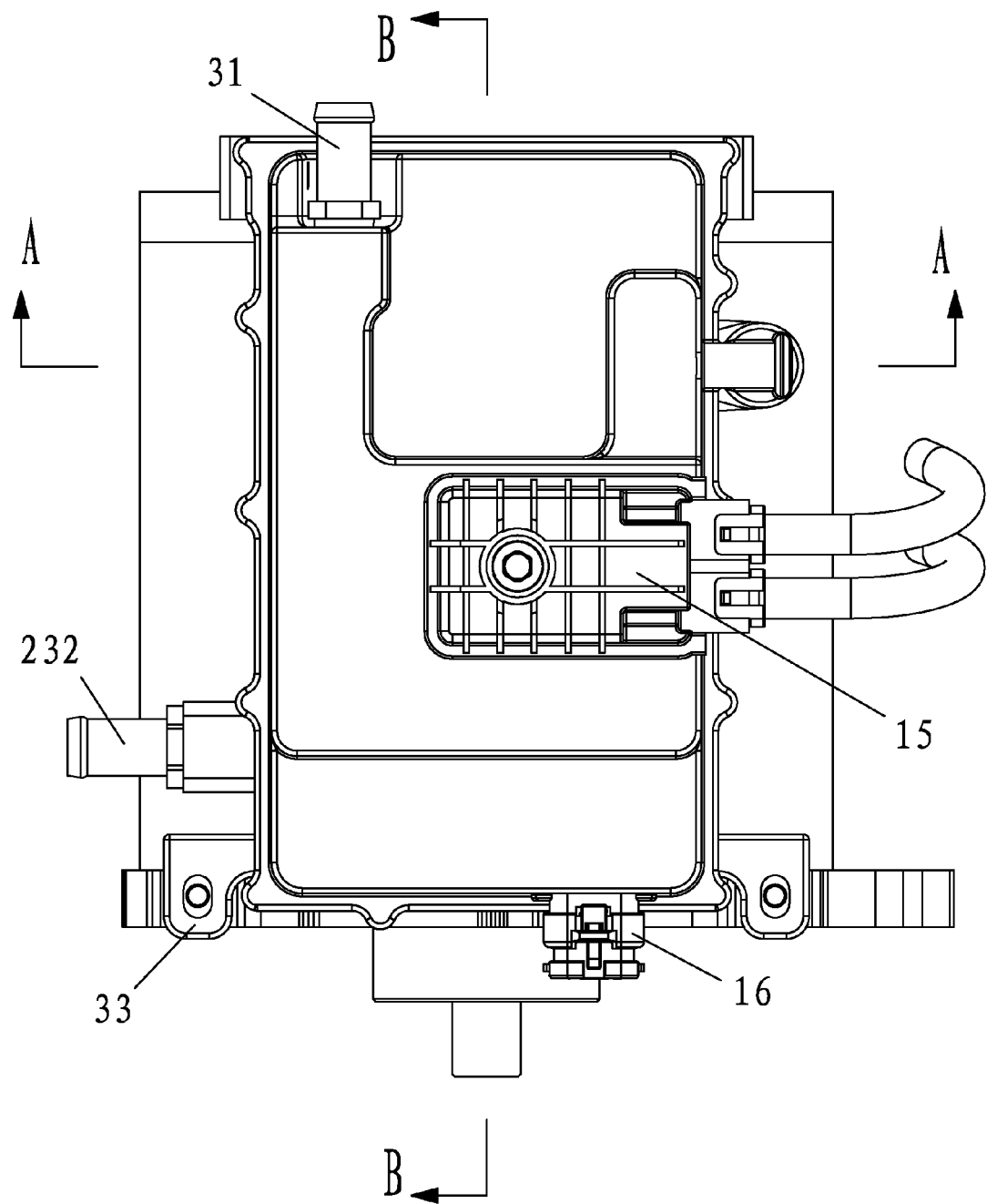
FIG. 7 is top view of an integrated system of a traction motor and an inverter in accordance with one embodiment of the invention.
Figure 8:
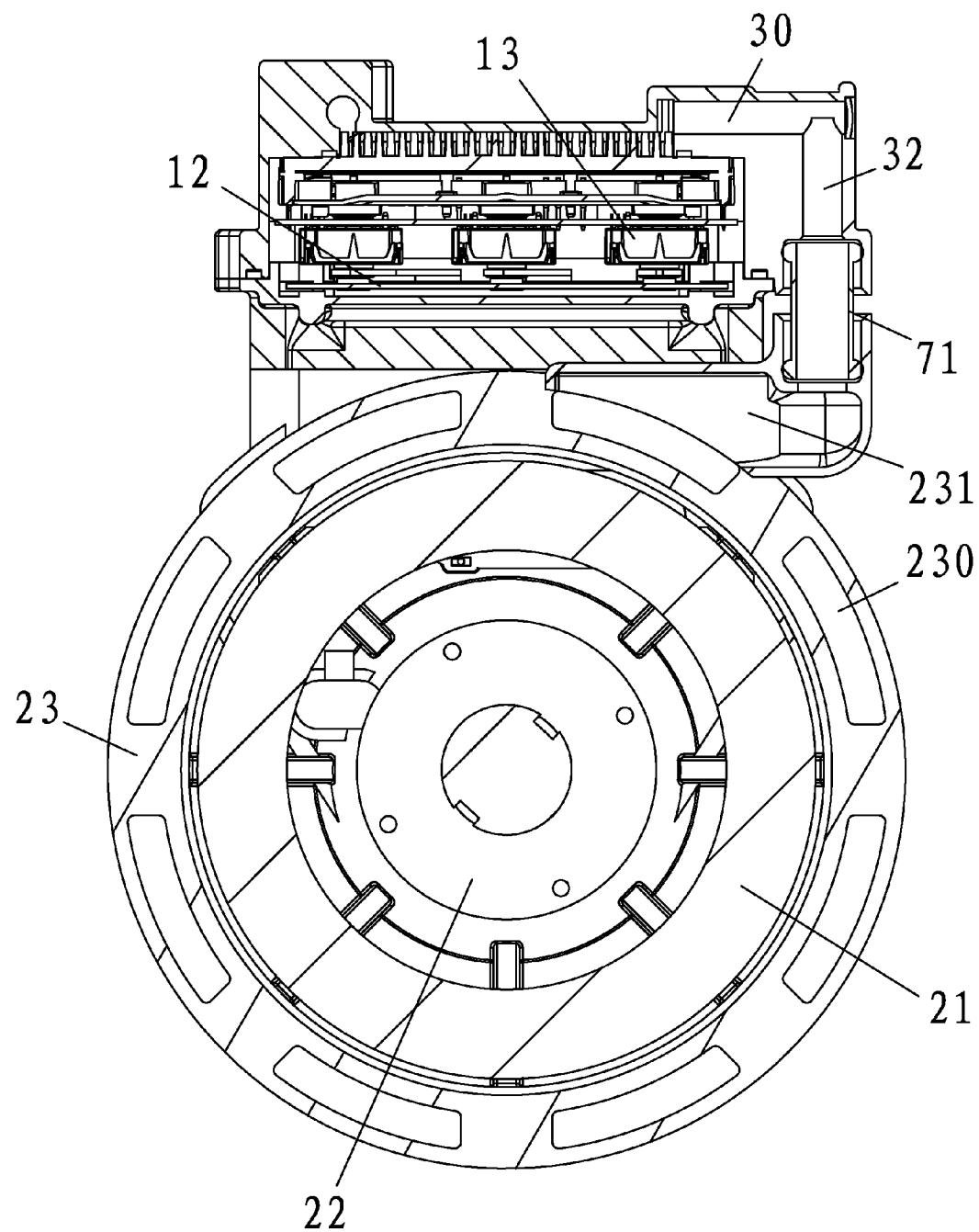
FIG. 8 is a cross sectional view taken from line A-A of FIG. 7.
Figure 9:
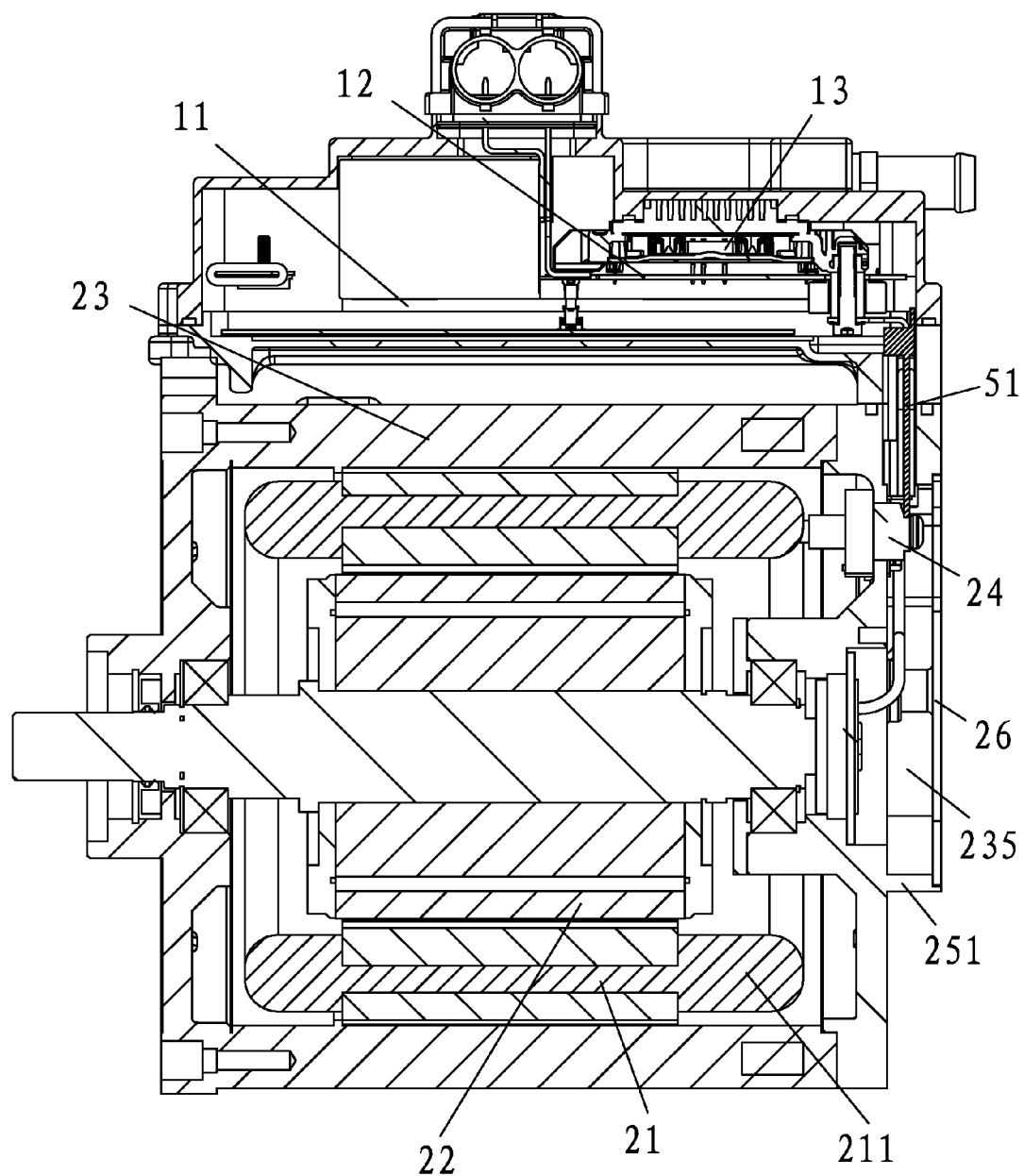
FIG. 9 is a cross sectional view taken from line B-B of FIG. 7.
Figure 10:
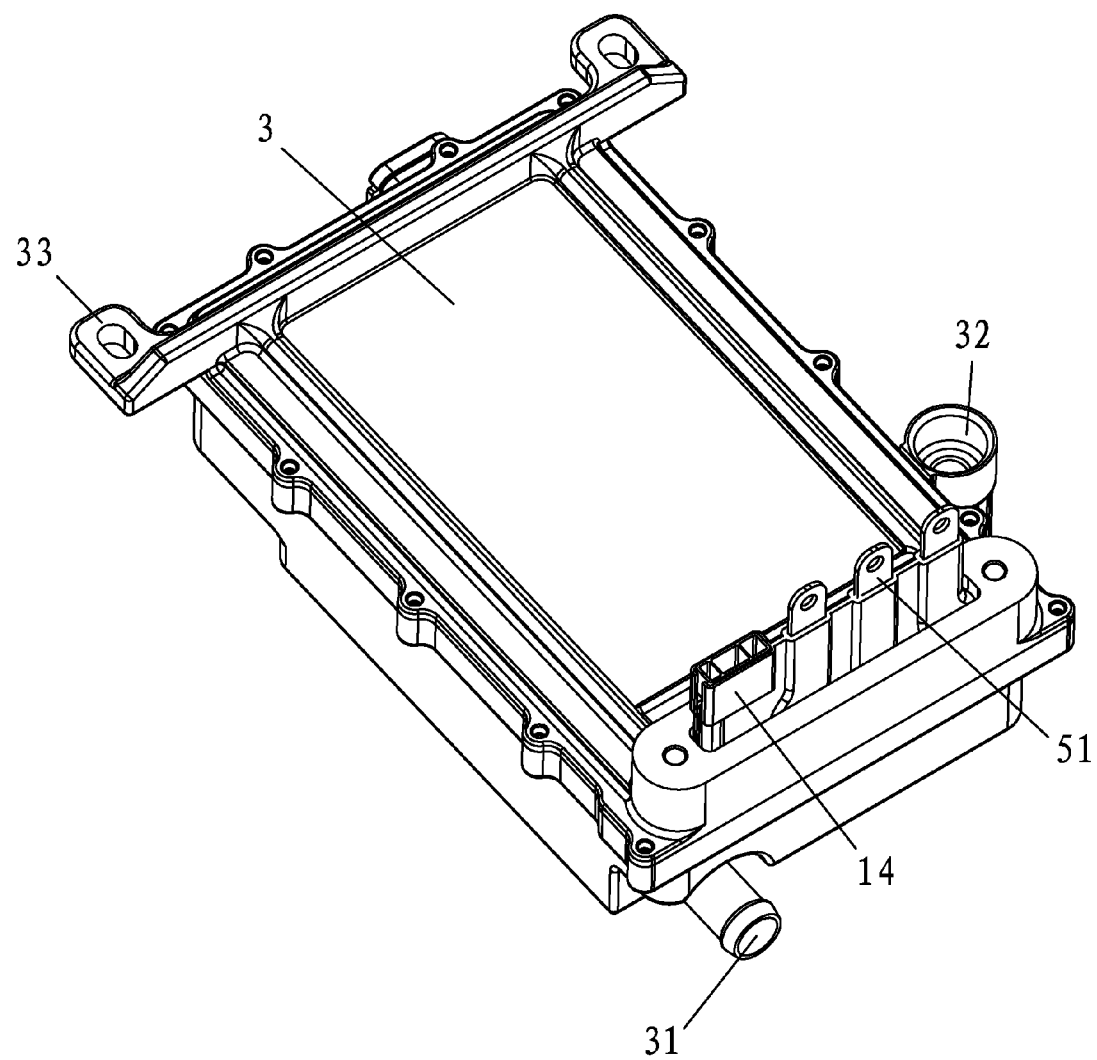
FIG. 10 is a stereogram of an inverter in accordance with one embodiment of the invention.
Figure 11:
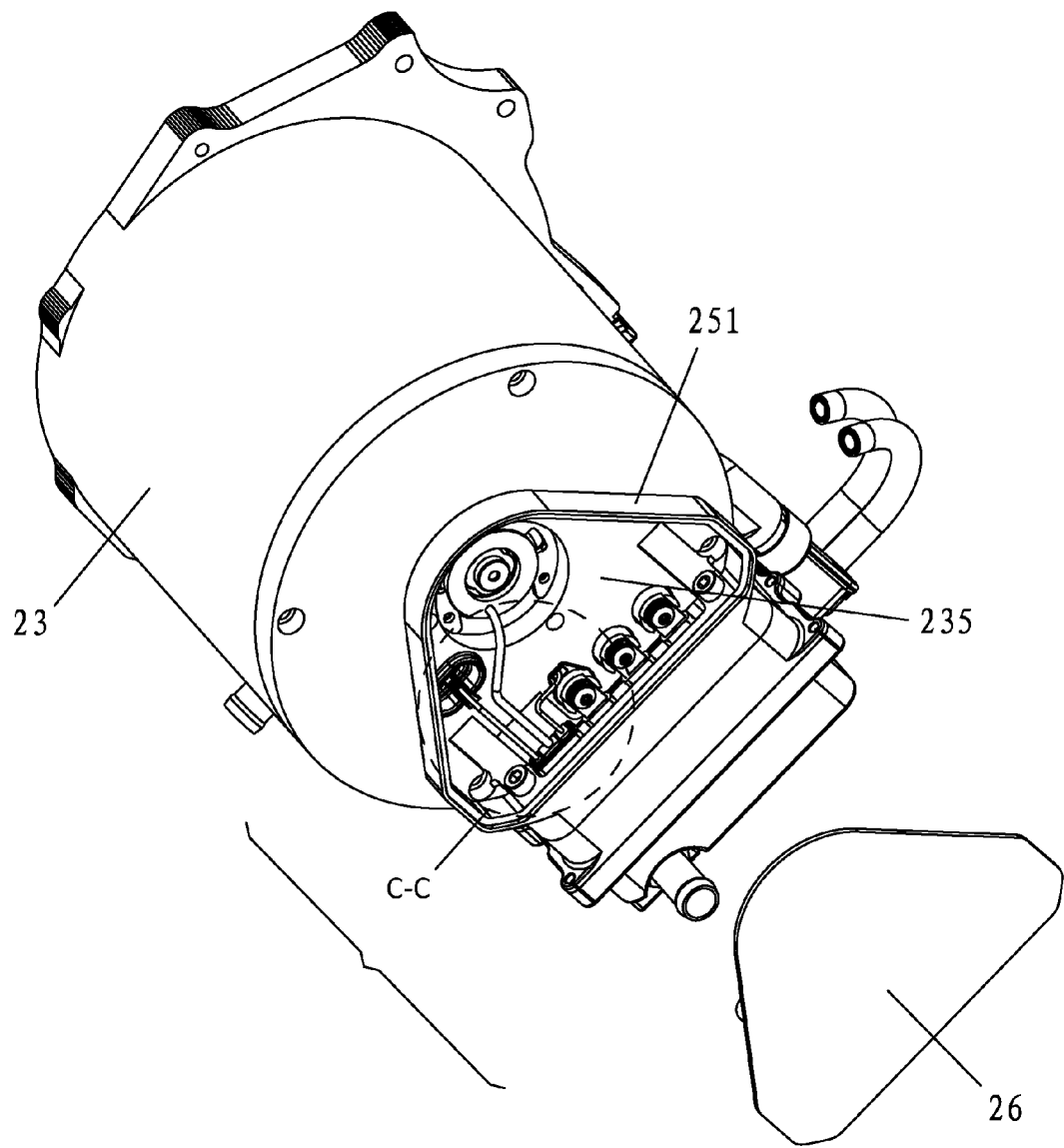
FIG. 11 is another exploded view of an integrated system of a traction motor and an inverter in accordance with one embodiment of the invention.
Figure 12:
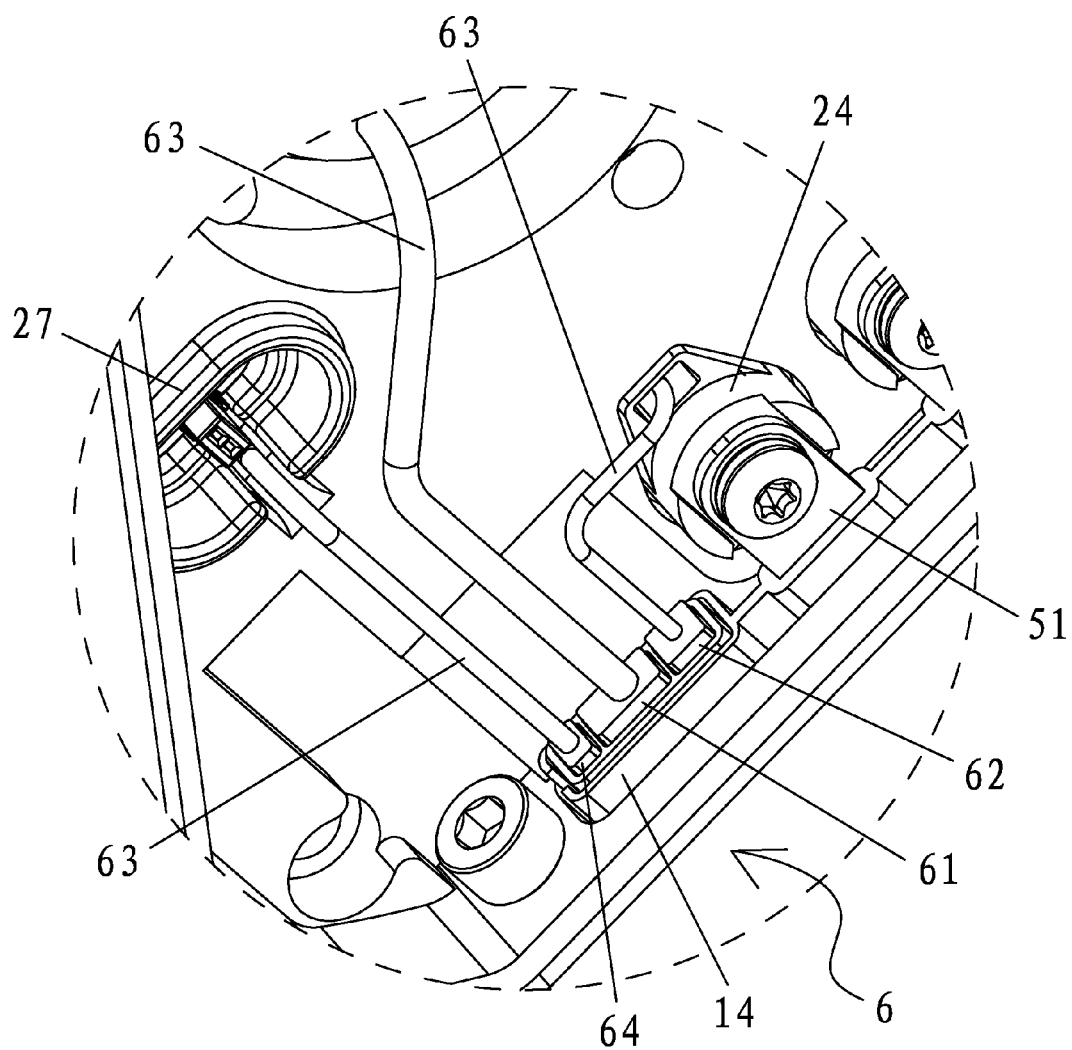
FIG. 12 is an enlarged view taken from part C-C of FIG. 11.
Figure 13:
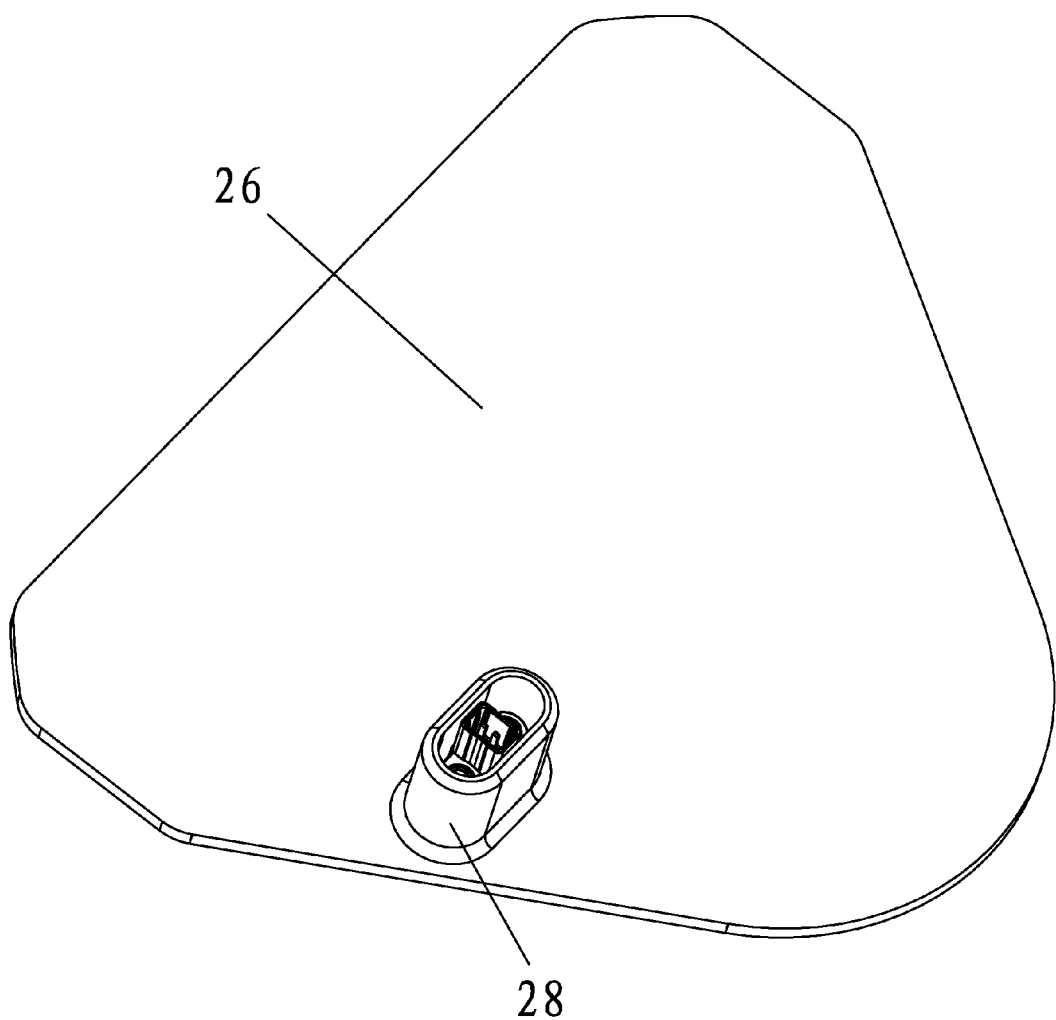
FIG. 13 is a stereogram of a mounting cover plate in accordance with one embodiment of the invention.
Figure 14:
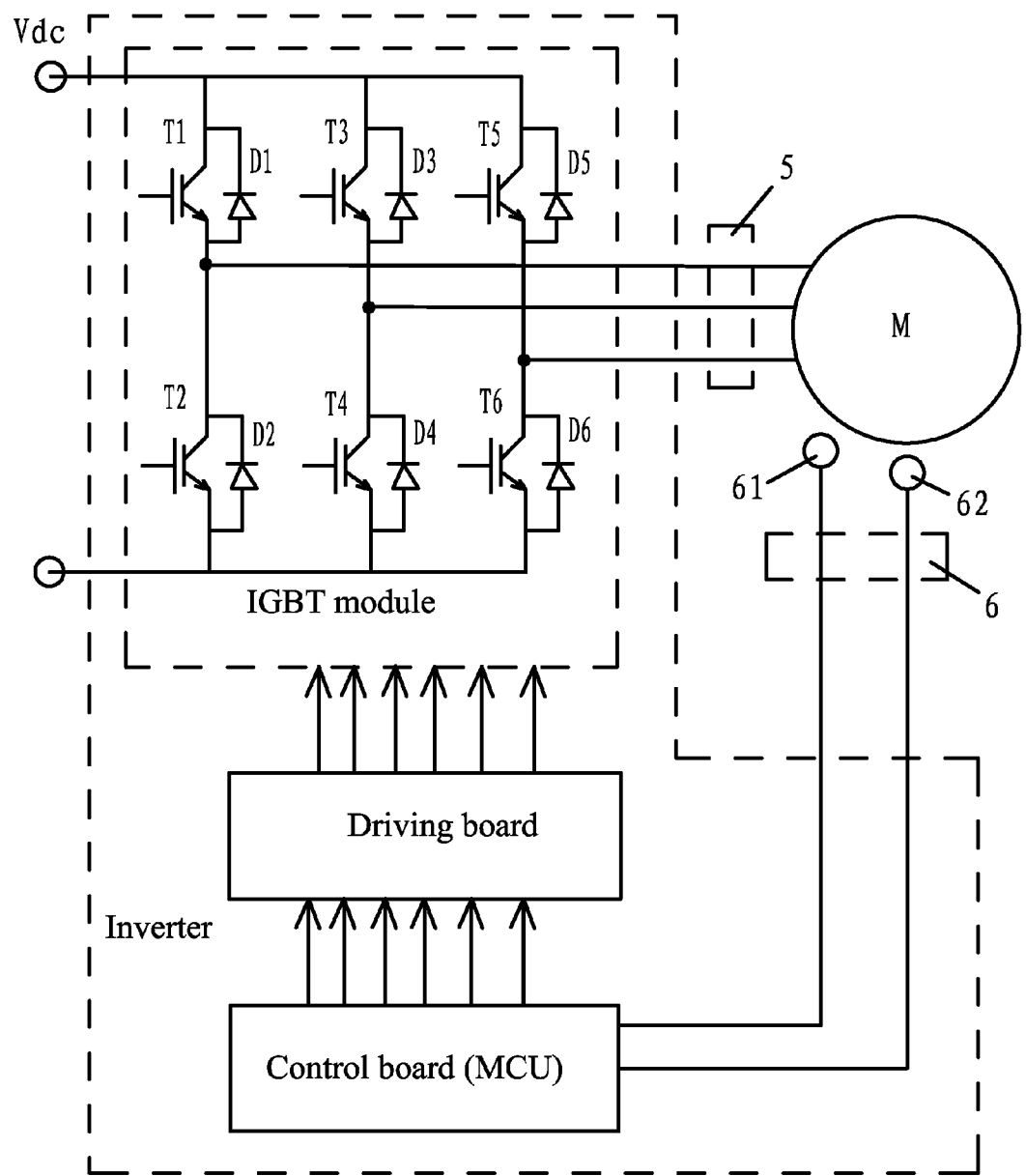
FIG. 14 is a schematic circuit diagram of an integrated system of a traction motor and an inverter in accordance with one embodiment of the invention.

As shown in FIGS. 4-14, an integrated system of a traction motor and an inverter, the system comprises an inverter 1 and a traction motor 2. The traction motor 2 comprising: a stator assembly 21, a rotor assembly 22, and a motor housing 23. The stator assembly 21 is provided with a coil winding 211. The inverter 1 comprises: a control board 11, a driving board 12, and an IGBT module 13. The inverter 1 further comprises an inverter housing 3. The control board 11, the driving board 12, and the IGBT module 13 are disposed inside the inverter housing 3. The inverter housing 3 is installed on the motor housing 23 via a mechanical interface 4. The traction motor 2 and the inverter 1 are connected via a high-voltage power interface 5 to enable the coil winding 211 and the IGBT module 13 of the inverter to realize the high-voltage electric connection. The IGBT module 13 comprises: a first switching tube T1, a second switching tube T2, a third switching tube T3, a fourth switching tube T4, a fifth switching tube T5, a sixth switching tube T1, a first diode D1, a second diode D2, a third diode D3, a fourth diode D4, a fifth diode D5, and a sixth diode D6. The above components form three bridge arms. Control terminals of the first switching tube T1, the second switching tube T2, the third switching tube T3, the fourth switching tube T4, the fifth switching tube T5, and the sixth switching tube T1 are connected to the control board 11. The control board 11 is a microprocessor MCU and controls the inverter 1 to operate via the driving board 11.

The traction motor 2 and the inverter 1 are further connected via a low-voltage signal interface 6. The low-voltage signal interface 6 transmits an operation state of the traction motor 2 to the inverter 1. The traction motor 2 and the inverter 1 are further connected via a cooling system interface 7. A bottom part of the inverter housing 3 is provided with a first cooling water channel 30 and forms a first water inlet 31 and a first water outlet 32. The motor housing 23 is provided with a second cooling water channel 230 and forms a second water inlet 231 and a second water outlet 232. The first water outlet 32 is connected to the second water inlet 231 via the cooling system interface 7 so as to connect the first cooling water channel 30 of the inverter housing 3 and the second cooling water channel 230 of the motor housing 23 in series. The cooling system interface 7 is a water pipe interface 71. The mechanical interface 4 comprises a plurality of mounting feet 33 protruding from the inverter housing 3. A bearing seat 233 protrudes from a top of the motor housing 23. The inverter housing 3 is disposed on the top of the motor housing 23. The mounting feet 33 are supported by the bearing seat 233 and are fastened on the bearing seat 233 by bolts. The high-voltage power interface 5 comprises: a high-voltage power terminal 51 extending from the IGBT module 13 to a bottom surface of the inverter 1, a mounting seat 234 disposed at an end part of a motor housing 23, and a wiring chamber 235 disposed beneath the mounting seat 234. The coil winding 211 of the traction motor 2 is connected to a coil terminal 24 in the wiring chamber 235 of the motor housing 23. The high-voltage power terminal 51 passes through the mounting seat 234 and is extended into the wiring chamber 235 and is in electric connection with the coil terminal 24. An outer surface of an end cover 25 is convex to form an annular skirt board 251. The annular skirt board 251 encircles to form the wiring chamber 235. A mounting cover plate 26 is disposed on the annular skirt board 251. The low-voltage signal interface 6 comprises: a resolver signal terminal 61 and a motor temperature sensor terminal 62. A first signal wire 63 and a second signal wire 63 are led out from a resolver and a motor temperature sensor and are connected to the resolver signal terminal 61 and the motor temperature sensor terminal 62, respectively. A lead socket 14 protrudes from the bottom surface of the inverter 1 close to the high-voltage power interface 5. The lead socket 14 passes through the mounting seat 234 and is extended inside the wiring chamber 235. The resolver signal terminal 61 and the motor temperature sensor terminal 62 are inserted into the lead socket 14. The inverter housing 3 further comprises a high-voltage DC bus voltage input interface 15 and an external low-voltage signal interface 16. The external low-voltage signal interface 16 is used to connect to a control system of a car. A high-voltage interlock mechanism is disposed on the wiring chamber 235 and the mounting cover plate 26. The high-voltage interlock mechanism comprises: a first connector 27 disposed inside the wiring chamber 235, and a second connector 28 disposed on the mounting cover plate 26. When the mounting cover plate 26 is mounted on a top surface of the annular skirt board 251, the first connecter 27 and the second connector 28 are in electric connection. The low-voltage signal interface 6 further comprises a high-voltage interlock terminal 64. A third signal wire 63 led from the first connector 27 is connected to the high-voltage interlock terminal 64. The high-voltage interlock terminal 64 is inserted into the lead socket 14. When the mounting cover plate 26 is opened, the first connector 27 and the second connector will be disconnected, and the first connector will output a control signal to the inverter 1 via the high-voltage interlock terminal 64 of the third signal wire 63 to disconnect a high-voltage power supply.

The high-voltage interlock mechanism can also be a limit switch. When the mounting cover plate 26 is mounted on the top surface of the annular skirt board 251, the mounting cover plate 26 will press the limit switch so as to close the limit switch. Similarly, when the mounting cover plate 26 is opened, the limit switch will be disconnected, and the limit switch will output the control signal to the inverter 1 to disconnect the high-voltage power supply.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for integrating a traction motor and an inverter, the method comprising:
   1) providing a traction motor, the traction motor comprising a motor housing and a coil winding;
   2) providing an inverter, the inverter comprising: an inverter housing, and an IGBT module;
   3) independently installing the inverter in the inverter housing to form an interface, the interface comprising a mechanical interface and a high-voltage power interface;
   4) using the mechanical interface to install the inverter housing on the motor housing to form an entire body; and
   5) using the high-voltage power interface to provide a high voltage electric connection between the coil winding of the traction motor and the IGBT module of the inverter.

2. The method of claim 1, wherein
the interface further comprises a low-voltage signal interface;
the low-voltage signal interface is utilized to provide a low-voltage electric connection between the traction motor and the inverter; and
a detection signal inside the traction motor is transmitted to the inverter via the low-voltage signal interface.

3. The method of claim 1, wherein
the interface further comprises a cooling system interface; and
the cooling system interface enables a cooling medium to flow between the inverter housing and the motor housing.

4. The method of claim 2, wherein
the interface further comprises a cooling system interface; and
the cooling system interface enables a cooling medium to flow between the inverter housing and the motor housing.

5. An integrated system of a traction motor and an inverter, the system comprising:
   a) the inverter, the inverter comprising: a control board, a driving board, an IGBT module, an inverter housing; and
   b) the traction motor, the traction motor comprising: a stator assembly, a rotor assembly, and a motor housing; the stator assembly comprising a coil winding;
   c) a mechanical interface; and
   d) a high-voltage power interface;
wherein
the control board, the driving board, and the IGBT module are disposed inside the inverter housing;
the inverter housing is disposed on the motor housing via the mechanical interface; and
the traction motor and the inverter are connected via the high-voltage power interface to enable the coil winding and the IGBT module of the inverter to realize a high-voltage electric connection.

6. The system of claim 5, wherein
the traction motor and the inverter are further connected via a low-voltage signal interface; and
the low-voltage signal interface transmits an operation state of the traction motor to the inverter.

7. The system of claim 6, wherein
the traction motor and the inverter are further connected via a cooling system interface;
a bottom part of the inverter housing comprises: a first cooling water channel, a first water inlet, and a first water outlet;
the motor housing comprises: a second cooling water channel, a second water inlet, and a second water outlet; and
the first water outlet is connected to the second water inlet via the cooling system interface to connect the first cooling water channel of the inverter housing (3) and the second cooling water channel of the motor housing in series.

8. The method of claim 7, wherein the cooling system interface is a water pipe interface.

9. The system of claim 5, wherein
the mechanical interface comprises a plurality of mounting feet protruding from the inverter housing;
a bearing seat protrudes from a top of the motor housing;
the inverter housing is disposed on the top of the motor housing; and
the mounting feet are supported by the bearing seat and are fastened on the bearing seat by bolts.

10. The system of claim 5, wherein
the high-voltage power interface comprises: a high-voltage power terminal extending from the IGBT module to a bottom surface of the inverter, a mounting seat disposed at an end part of a motor housing, and a wiring chamber disposed beneath the mounting seat;
the coil winding of the traction motor is connected to a coil terminal in the wiring chamber of the motor housing; and
the high-voltage power terminal passes through the mounting seat and is extended into the wiring chamber and is in electric connection with the coil terminal.

11. The system of claim 10, wherein
an outer surface of an end cover is convex to form an annular skirt board;

the annular skirt board encircles to form the wiring chamber; and a mounting cover plate is disposed on the annular skirt board.

12. The system of claim 11, wherein the low-voltage signal interface comprises: a resolver signal terminal and a motor temperature sensor terminal;

a first signal wire and a second signal wire are led out from a resolver and a motor temperature sensor and are connected to the resolver signal terminal and the motor temperature sensor terminal, respectively;

a lead socket protrudes from the bottom surface of the inverter close to the high-voltage power interface;

the lead socket passes through the mounting seat and is extended inside the wiring chamber; and the resolver signal terminal and the motor temperature sensor terminal are inserted into the lead socket.

13. The system of claim 5, wherein the inverter housing further comprises a high-voltage DC bus voltage input interface and an external low-voltage signal interface.

14. The system of claim 12, wherein a high-voltage interlock mechanism is disposed on the wiring chamber and the mounting cover plate.

15. The system of claim 14, wherein the high-voltage interlock mechanism comprises: a first connector disposed inside the wiring chamber, and a second connector disposed on the mounting cover plate;

when the mounting cover plate is mounted on a top surface of the annular skirt board, the first connecter and the second connector are in electric connection;

the low-voltage signal interface further comprises a high-voltage interlock terminal;

a third signal wire led from the first connector is connected to the high-voltage interlock terminal; and the high-voltage interlock terminal is inserted into the lead socket.

* * * * *